(12) United States Patent
Schüssler et al.

(10) Patent No.: US 8,214,109 B2
(45) Date of Patent: Jul. 3, 2012

(54) SEAT CONTROL ELECTRONIC SYSTEM AND METHOD FOR A MOTOR-DRIVEN MOTOR VEHICLE ADJUSTING DEVICE

(75) Inventors: Markus Schüssler, Zeitlofs (DE); Thomas Rösch, Querfurt (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 732 days.

(21) Appl. No.: 12/279,705

(22) PCT Filed: Feb. 15, 2007

(86) PCT No.: PCT/EP2007/001320
§ 371 (c)(1),
(2), (4) Date: Oct. 9, 2008

(87) PCT Pub. No.: WO2007/093420
PCT Pub. Date: Aug. 23, 2007

(65) Prior Publication Data
US 2009/0055055 A1    Feb. 26, 2009

(30) Foreign Application Priority Data
Feb. 17, 2006  (DE) .................. 20 2006 002 524 U

(51) Int. Cl.
*G05D 3/12* (2006.01)
(52) U.S. Cl. ........................................................ 701/49
(58) Field of Classification Search .................. 701/49
See application file for complete search history.

(56) References Cited

U.S. PATENT DOCUMENTS

| | | | |
|---|---|---|---|
| 7,843,153 B2 * | 11/2010 | Held et al. ..................... 318/264 |
| 2002/0180390 A1 | 12/2002 | Tyckowski | |
| 2005/0110445 A1 | 5/2005 | Caussat | |
| 2008/0284362 A1 * | 11/2008 | Buhlheller et al. ........... 318/434 |

FOREIGN PATENT DOCUMENTS
DE    10 2004 030499    2/2006
* cited by examiner

*Primary Examiner* — Paul N Dickson
*Assistant Examiner* — Nicole Verley
(74) *Attorney, Agent, or Firm* — Scott T. Weingaertner; Joseph D. Eng, Jr.; King & Spalding LLP

(57) ABSTRACT

The invention relates to a seat control electronic system for controlling a drive of a motor vehicle seat which is configured for detecting a characteristic variable of the drive during several short actuations of the drive, and to evaluate variables respectively associated with several short actuations, and to determine a blocking function according to the evaluations.

11 Claims, 5 Drawing Sheets

SEAT CONTROL ELECTRONIC SYSTEM AND METHOD FOR A MOTOR-DRIVEN MOTOR VEHICLE ADJUSTING DEVICE

FIELD OF THE INVENTION

The invention relates to a seat control electronic system which is designed to control and regulate a motor-driven motor vehicle seat adjusting device and has a trapping prevention function. The invention also relates to a method for controlling a motor-driven motor vehicle adjusting device, in particular a seat adjusting means.

BACKGROUND OF THE INVENTION

A trapping prevention guard is advantageous in motor-driven seat adjusting devices in motor vehicles for safety reasons, in order to stop and possibly reverse the motorized drive when necessary, that is to say if an object or body part is trapped. Characteristic variables of the motorized drive can be evaluated in order to determine whether trapping has occurred. Such characteristic variables are, for example, the motor voltage, the motor current or the rotation speed. The motor moment can be determined from these characteristic variables, and an excess force can be determined from the motor moment in turn. The excess force is given by the difference between the total force exerted by the motor and a total adjusting force which is required, in particular, to overcome the friction and to accelerate the adjusting device. However, it is difficult to determine the adjusting force since, for example, the friction can vary during the course of the adjustment process on account of areas with severe running difficulties. In addition, aging effects or else temperature influences can have a considerable influence on the friction. Temporarily varying acceleration forces are also taken into account when determining the excess force.

According to EP 1 310 030 B1, a large number of individual forces are added up at a summation point in order to determine a resulting excess force and an excess force or a trapping force is determined by comparison with the force currently exerted by the motor.

SUMMARY OF THE INVENTION

The invention is based on the object of providing a seat control electronic system and a method for detecting a trapping instance during a seat adjustment operation as reliably as possible.

Accordingly, a seat control electronic system with a trapping prevention function for a motor-driven seat adjusting device is provided. The seat control electronic system is formed and designed to determine an adjusting movement of a drive from at least one detected characteristic variable of the drive. Furthermore, the seat control electronic system is designed to determine trapping of an object or body part during a plurality of brief adjustment operations of the drive in the same adjustment direction. In this case, a plurality of brief adjustment operations of the drive is to be understood as two, three or even more adjustment operations performed by the user attempting, for example, to use the plurality of brief actuation operations to actuate a specific adjustment position by means of this jogging operation. It may not be possible to determine a trapping instance during one of these adjustment operations itself on account of the brief duration of the actuation operation.

In order to be able to evaluate a larger number of measured values for determining a trapping instance, the seat control electronic system is therefore formed and designed to determine a trapping instance from measured values of the characteristic variable of a first adjustment operation and from measured values of the characteristic variable of at least a second brief adjustment operation. In this case, the first adjustment operation can likewise be performed briefly, for example for one second.

The object is also achieved by a seat control electronic system of a motor-driven motor vehicle seat adjusting device which is formed to monitor for a trapping instance from at least one detected characteristic variable of a drive. The seat control electronic system is designed to determine a first total load exerted by the drive during a first adjustment operation. The seat control electronic system is also designed to determine a second total load exerted by the drive after an adjustment break in the event of a second adjustment operation in the same direction. The adjustment break is temporally defined between two adjustment operations, so that these two adjustment operations are separated from one another by this adjustment break.

In this case, the seat control electronic system does not delete an evaluation of the determined first total load if an adjustment path of the second adjustment operation falls below a threshold. The threshold therefore serves as a criterion on the basis of which the seat control electronic system distinguishes between a plurality of brief adjustment operations and a "normal" adjustment operation. In this case, a "normal" adjustment operation permits a trapping instance to be determined during this adjustment operation. If the adjustment path is below this threshold, the evaluation of the determined first total load for determining a trapping instance continues to be used. If the adjustment distance is above this threshold, the evaluation of the determined first total load for determining a trapping instance is rejected since enough measurement signals are available for detecting a trapping instance, in particular during the second adjustment operation.

If the evaluation for the first adjustment operation is not deleted, the seat control electronic system is designed to stop the drive or reverse the adjustment direction of the drive if a trapping instance is detected as a function of an evaluation of the first total load and the second total load.

In this case, the motor torque is determined from detected characteristic or actuating variables of the motor, for example the motor current, the motor rotation speed etc., as the total load. As an alternative or in addition to the motor torque, it is also possible to determine a characteristic variable, which represents the total load, directly from the characteristic variables of this type without determining the actual torque, or preferably to use the detected characteristic variable, in particular the rotation speed detected, for example, by means of a Hall sensor, directly as a criterion for the total load. The detected characteristic variable is therefore simultaneously a direct representation of the total load. When the rotation speed is used as a characteristic variable, it is possible to conclude, specifically from a drop in the rotation speed, that the total load has increased. When a rotation speed-controlled DC motor is used, a control or actuating signal can be used instead of the rotation speed.

In a first development, provision is made for the seat control electronic system to be designed to determine and to store a first nominal load during the first adjustment operation from the first total load. The seat control electronic system is designed to determine whether trapping has occurred during the second adjustment operation from a comparison between the first nominal load and the second total load which varies during the second adjustment operation.

According to a second development, the seat control electronic system is designed to determine and store a second nominal load firstly during a start phase of the second adjustment operation from the second total load. However, this is done only if the adjustment path of the second adjustment operation exceeds the threshold. In this case, the control device is designed to determine whether trapping has occurred during a monitoring phase from a comparison between the second nominal load and the second total load which varies during the second adjustment operation.

In an advantageous embodiment, the seat control electronic system is designed to delete the evaluation after the threshold is exceeded. The seat control electronic system replaces the determined first nominal load with the second nominal load for the further determination of a trapping instance. The start phase advantageously corresponds to a translatory adjustment path of up to 50 mm or an inclination adjustment of approximately 1° of the adjusting device.

Depending on the possible structural design of a motor vehicle seat, a plurality of brief adjustment operations in the direction of the trapped object or body part first lead to a significant trapping force. The seat control electronic system is therefore preferably designed to determine a third total load or a further total load after a further adjustment break in the event of a third adjustment operation and any further brief adjustment operation in the same adjustment direction.

Furthermore, the seat control electronic system is advantageously designed to not delete an evaluation of the determined first total load if an adjustment path of the third adjustment operation or of the further adjustment operation falls below the threshold. Instead, the seat control electronic system stops the drive or reverses the adjustment direction of the drive if a trapping instance is detected by the seat control electronic system as a function of an evaluation of the first total load and the third total load.

The seat control electronic system is preferably designed to employ a first mathematical model in order to determine the total load, in particular during the first adjustment operation, and to change over to a second mathematical model which takes into account the trapping instance only if there is a significant deviation between the total load and the nominal load or if there is a significant deviation between the detected characteristic variable during the second or a further adjustment operation for the assessing as to whether trapping has occurred.

The object according to the invention is also achieved by a seat control electronic system of a seat adjusting device of a motor vehicle which is formed and designed to detect a characteristic variable of a drive of the seat adjusting device during a plurality of brief actuation operations of the drive. In this case, the seat control electronic system is designed to evaluate the values of characteristic variable which are in each case associated with the plurality of brief actuation operations. The seat control electronic system determines a trapping instance as a function of these evaluations of a plurality of actuation operations.

During regular operation, that is to say during a continuous, uninterrupted actuation operation, provision is made for the total load exerted by the motorized drive to be determined at the beginning of each adjustment operation during a start phase and stored as the nominal load of the adjusting device. In this case, the nominal load is made up, in particular, of the frictional load which is to be overcome and the acceleration work. The start phase is followed by a monitoring phase during which the process determines whether trapping has occurred from a comparison, in particular by calculating the difference between the determined nominal load and the current total load. When a trapping instance is identified, a countermeasure, for example stopping or reversal of the motorized drive, is again initiated.

One particular feature of this is the determination of the nominal load at the beginning of the adjustment process. By means of this, the current adjusting force is determined and used as a comparison value for the monitoring phase. In this case, trapping is not monitored for during the start phase during regular operation. It is assumed here that no trapping has occurred during the start phase. This is based on the consideration that it can usually be presumed in the case of seat adjustment that a person sitting on the seat or behind the seat initially has a sufficient degree of freedom of movement or that the elasticity of the seat cushion is high enough for the person to not get trapped at the beginning of the adjustment process. The adjustment path is therefore assumed to be free during the start phase during which the nominal load can be determined from the total load exerted by the drive.

A trapping instance can be specifically precluded within this specified region for the adjustment path. At the same time, this region is large enough to determine the nominal load sufficiently accurately. The mechanical coupling means there is a direct correlation between the number of revolutions of the motor and the translatory adjustment path or the adjustment path in the event of inclination adjustment. Specific time windows or adjustment path sections for the start phase can therefore be determined as a function of the respective system by means of the rotation speed of the DC motor which is generally used. In this case, a translatory adjustment path is to be understood, in particular, as adjustment of the surface of the seat in the longitudinal direction. Translatory and rotary movements of the adjusting mechanism can be used to exert the adjusting movement.

A mathematical model which is formed in the manner of a control loop can be used when the total load of the motor is determined by evaluating motor characteristic variables. An actuating variable, for example the motor voltage, which influences control of the motor is used as an input variable for the mathematical model, and the current total load is then determined from this input variable. According to an expedient development, provision is now made to change over from a first model to a second model, which differs from the first, when there is a significant deviation between the total load and the nominal load or when there is a significant deviation between the detected characteristic variable and the variable correlated to the load, in order to be able to use this second model to assess whether trapping has actually occurred.

A changeover is made to the second model particularly when there is a predefined deviation of the rotation speed from an average rotation speed, for example when the rotation speed drops to approximately 0.7 times the average rotation speed. As an alternative, the characteristic variable used for the changeover when there is a significant deviation may also be, for example, the motor current and its deviation from an average motor current. This development is initially based on the consideration that a significant or characteristic deviation may be an indication of a trapping instance, but that this is not yet sufficient to reliably assess a trapping instance. Different scenarios which could lead to an increase in the total load without trapping occurring are possible particularly in the trapping prevention guard for a seat adjustment means. Furthermore, it can be assumed here that, in particular, a more sensitive mathematical model is required to make the decision as to whether trapping has occurred. In contrast, this also means that a simple algorithm which uses only few resources is used for the first model in the normal case.

In this case, provision is preferably made for the first model to take into account the friction which occurs in the adjusting device and for the second model to additionally comprise a spring model which takes into account the trapping instance. The use of the spring model is based on the consideration that the trapped person is pressed into the seat cushion in the event of a possible trapping instance. This may be the seat cushion of a back seat toward which a front seat is moved. However, it may also be the seat cushion of the front seat when the front seat is moved forward toward the steering wheel or the dashboard. The soft seat cushion exerts a counter-force, with the value of the counter-force being comparable with a spring force. The use of a spring model of this type therefore permits decisions as to whether trapping has occurred to be derived particularly by determining characteristic spring constants. In order to permit smooth transition between the two mathematical models, at least some of the variables obtained with the first model are used as input variables for the second model when a changeover is made to the second model.

The significant and characteristic deviation between the total load and the nominal load used is preferably a limit value for the difference between these two load values being exceeded. In the present case of the brief adjustment operations, the total load is preferably evaluated during the second adjustment operation or during a further, following adjustment operation with the nominal load of the first adjustment operation by the difference between the total load of the second or further adjustment operations and the nominal load of the first adjustment operation being compared with the limit value.

As an alternative or in addition, the situation of a limit value being exceeded is preferably also used for differentiation of this difference with respect to time or location, for example. The rotation speed is again preferably used as the direct characteristic variable for the load in this case. The nominal load is represented by an, in particular average, rotation speed. A rotation speed limit value is therefore provided, and a significant deviation is assumed to be present when this limit value is undershot.

Furthermore, the average value of the total load or of the detected characteristic variable which represents the total load is preferably used during the first adjustment operation to determine the nominal load. In order to prevent this value for the nominal load from being corrupted by start-up effects, the total load of the motorized drive which occurs during a start-up phase is preferably not taken into account. This start-up phase defines, for example, the region until the motor reaches its desired rotation speed. This is usually the case as early as after a few revolutions of the motor.

Since different adjusting forces can occur over the adjustment path, for example due to running difficulties, one expedient development makes provision for the nominal load to also be determined during the monitoring phase of regular operation without adjustment breaks and to be stored as the current nominal load which is used for the comparison with the total load during regular operation for subsequent measurements of the characteristic variable during the monitoring phase. The nominal load is therefore also determined during the monitoring phase, in particular continuously, starting with the value for the nominal load which is determined during the start phase. The nominal load is therefore also tracked during the monitoring phase. In this case, discrete time windows can be provided, during which the nominal load is determined. As an alternative to tracking the nominal load, it is also possible, in principle, to use the value for the nominal load, which value is determined during the start phase, for the entire actuating process as a constant comparison value.

As soon as a significant deviation in the nominal load is detected, the actual nominal load, which was determined last, of the adjustment operation is stored and the further profile of the total load during a second or further adjustment operation, in particular the difference between the total load and the stored nominal load or the difference between the values of the detected characteristic variables representing the total load and the nominal load, is then checked for the presence of a trapping instance. The situation of the significant deviation being exceeded alone is not an adequate criterion for determining the presence of a trapping instance since other situations, for example a local running difficulty or running-up against a mechanical stop, may be present. Identification of the significant deviation is therefore followed by a further check and evaluation of the profile of the total load.

A total torque is preferably determined as the total load and a nominal torque is preferably determined for the start phase from the characteristic variables of the motorized drive, with, in particular, a resulting moment, in particular a trapping moment, or a correlated variable being derived by calculating the difference. Furthermore, the trapping moment is expediently weighted with a weighting parameter, which takes into account the mechanics of the adjusting device, for determining the resulting clamping force. In this case, the weighting parameter takes into account, for example, the lever length, the lever transmission ratio or the position of the adjusting mechanism. In addition, information about the areas of risk, that is to say, for example, the distances between the seats, which are also dependent on the body size in particular, are incorporated in the weighting parameters. In this case, the values of the weighting parameters are preferably determined and stored with the aid of measurements on a physical model. As an alternative, the values can also be determined by calculation.

A spring model is expediently used as a basis for determining whether trapping has occurred, and in particular at least one spring constant is determined, on the basis of which a decision is made as to whether trapping has occurred. In this case, the absolute magnitude and/or the profile of the spring constants, that is to say their derivative, are/is preferably used to make the decision. The profile of the spring constants is used to make a distinction between different operating situations, specifically, in particular, a load movement, run-up against a stop, a panic reaction, a running difficulty and trapping. At least two determined values are expediently used for the spring constant, in order to ensure reliable association. To this end, at least three load threshold values are preferably defined, between which the spring constant is determined, in particular by interpolation.

DETAILED DESCRIPTION OF THE INVENTION

The method for reliable detection of a trapping instance explained below with reference to the figures applies to a motor-driven seat adjusting means in the motor vehicle sector. A device of this type has an adjusting mechanism which comprises a seat support which can usually be longitudinally adjusted in guide rails which are slightly inclined with respect to the horizontal. A backrest whose inclination can be adjusted is also attached to the seat support. In this case, the rotation point of the backrest is arranged such that it is somewhat spaced apart from the guide rails. Furthermore, the adjusting device comprises a respective drive motor both for translatory adjustment in the longitudinal direction of the seat support and for inclination adjustment of the backrest. These motors are usually a DC motor or a rotation speed-controlled DC motor.

When seats are automatically adjusted, there is a risk of a person being trapped in the seat to be adjusted or else between the seat to be adjusted and a back seat. A trapping instance of this kind leads to a high motor torque and therefore correlates to a higher force expended by the motor. This total torque generated by the motor is also generally called the total load in the present case. Identification of a trapping instance is problematical particularly in the case of seat adjustment of this type since the force to be additionally applied by the motor does not necessarily exhibit an abrupt increase in the event of trapping on account of the soft seat cushion.

Figure 1:
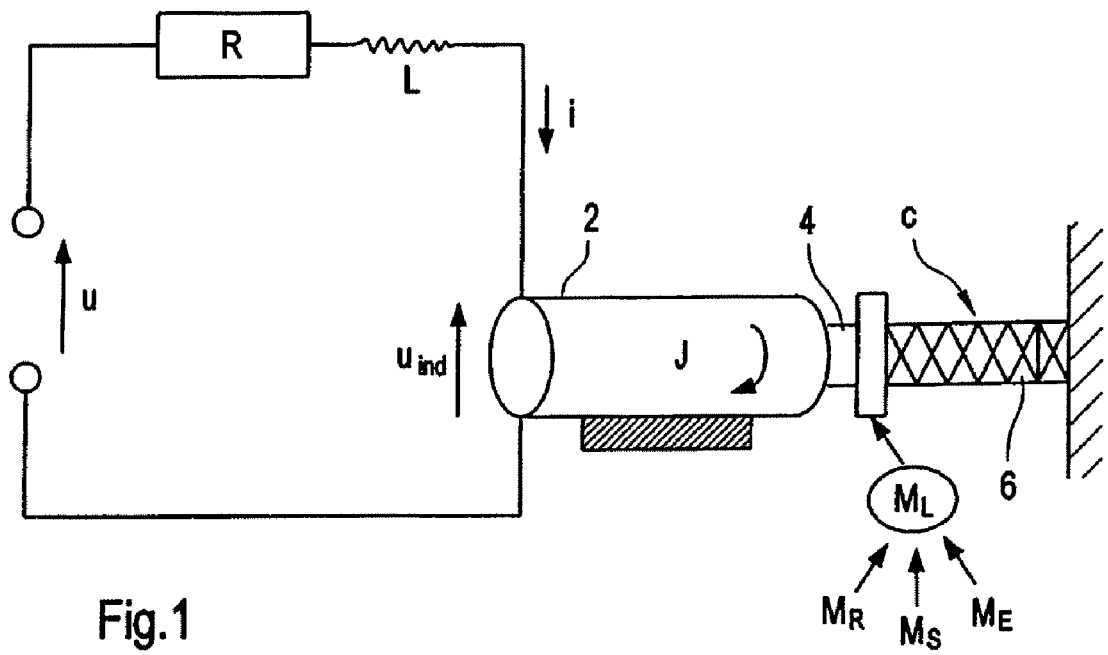
FIG. 1: a schematic and simplified illustration of a physical conceptual model of an adjusting device, in particular of a seat adjusting means.

The computational and mathematical treatment of an adjusting device of this kind with the aid of a control device is explained in greater detail below with reference to FIGS. 1 to 3. In this case, FIG. 1 shows a physical conceptual model of an adjusting device of this type. According to this physical model, the motor voltage u is applied to the motor 2 during operation and a motor current i flows. The electrical circuit has a non-reactive resistor R and an inductor L. A back e.m.f. $u_{ind}$ is induced during operation.

On account of the motor current i, the motor exerts a motor moment $M_{Mot}$ and drives a shaft 4 at a rotation speed n. The adjusting mechanism of the adjusting device is coupled to the shaft 4, this being represented by the moment of inertia J. In addition, a load moment $M_L$ is exerted by the adjusting mechanism, this load moment counteracting the motor moment $M_{Mot}$. The load moment $M_L$ is made up of a plurality of moment components, for example a moment of friction $M_R$ which is exerted on account of the friction of the adjusting device and can additionally be superimposed with a moment of running difficulty $M_S$.

In the event of trapping, a trapping moment $M_E$ is additionally added to the load moment $M_L$. This trapping moment $M_E$ has to be determined in order to be able to reliably identify trapping prevention. The problem here is that the further components of the load moment $M_L$ are variable. It is particularly difficult to identify a trapping instance in the case of trapping prevention for a seat adjusting means since the trapping force increases only slowly on account of the compliance of the seat cushion and a distinction can be made, for example, from a local running difficulty only with great difficulty.

In the event of trapping, a spring model is assumed in order to physically and mathematically describe in a simple model the real processes when a person is trapped between the seat and a further seat or the dashboard. In the physical model shown in FIG. 1, this is expressed by the trapping moment $M_E$ which contributes to the load moment $M_L$ being characterized as a spring moment of a spring 6 which counteracts the motor moment $M_{Mot}$. This spring 6 is further characterized by a spring stiffness which is represented by means of a spring constant.

Taking this physical model as a basis, the following equation 1 is given for the motor voltage u:

$$u = R \cdot i + L\, di/dt + u_{ind} \qquad \text{Equation 1}$$

This can be differentiated to give the equation 1' for the variable di/dt:

$$di/dt = 1/L(u - R \cdot i - K_1 n) \qquad \text{Equation 1'}$$

with the following relationship, according to which the induced voltage $u_{ind}$ is proportional to the rotation speed n and the proportionality factor is $K_1$, having been taken into account here:

$$u_{ind} = K_1 n \qquad \text{Equation 2}$$

Furthermore, the motor moment $M_{Mot}$ is proportional to the motor current i multiplied by a proportionality constant $K_2$:

$$M_{Mot} = K_2 i \qquad \text{Equation 3}$$

For the right-hand side of the physical model according to FIG. 1, the following equation, according to which the difference between the motor moment $M_{Mot}$ and the load moment $M_L$ is proportional to the change in rotation speed n, with the proportionality factor being the moment of inertia J, can be established for the torques:

$$M_{Mot} - M_L = J\, dn/dt \qquad \text{Equation 4}$$

The moment of inertia J is actually made up of several components, in particular the moment of inertia of the motor and that of the mechanical parts of the seat. Since very large transmission ratios are generally provided for motorized seat adjusting means, the proportion of the total moment of inertia of the mechanical parts can be ignored and it is sufficient to take into account the moment of inertia of the motor for the calculation. The following equation, according to which the trapping moment $M_E$ is proportional to the spring force $F_F$, with the proportionality factor $K_3$ being a weighting parameter which takes into account the geometry of the adjusting mechanism, can be derived from the spring model for the trapping moment $M_E$. In this case, the weighting parameter takes into account, for example, the lever length, the lever transmission ratio or the position of the adjusting mechanism. Information about the areas of risk, that is to say, for example, the distances between the seats which, in particular, are also dependent on the body size, are additionally incorporated in the weighting parameter. The spring force $F_F$ is in turn proportional to the rotation angle $\phi - \phi_K$ covered, with the proportionality factor being the spring constant c. In this case, $\phi_K$ is the rotation angle at the time point at the beginning of the trapping instance, that is to say when contact is made for the first time between the seat to be adjusted and the trapped person.

$$M_E = K_3 F_F = K_3 c(\phi - \phi_K) \qquad \text{Equation 5}$$

Figure 2:
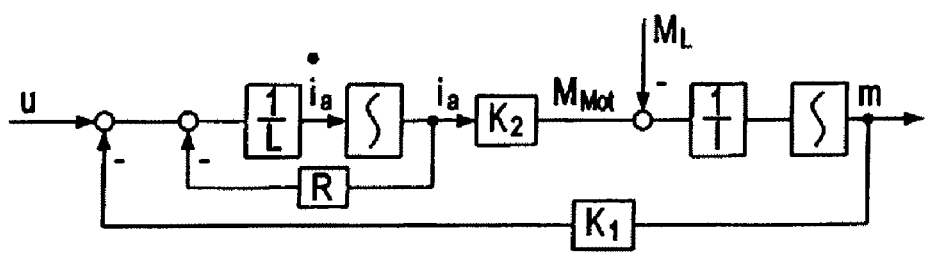
FIG. 2: a schematic and simplified illustration of a control loop for a first mathematical model for describing the individual processes in the adjusting device.
Figure 3:
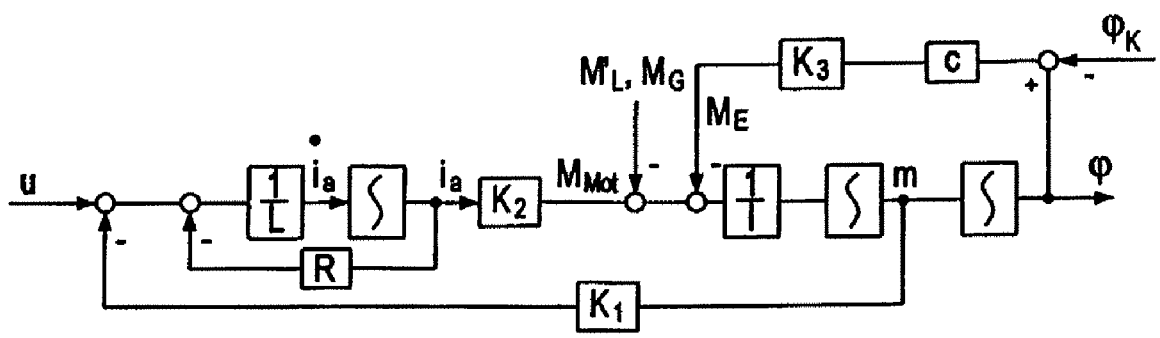
FIG. 3: a schematic and simplified illustration of a second control loop for a second mathematical model for describing the individual processes in the adjusting device, taking into account a trapping instance.

A mathematical model or a corresponding calculation algorithm, which can be represented by the control loop illustrated in FIG. 2 if the spring model which represents the trapping instance is still not taken into account, can be derived from this physical model. This control loop substantially represents the relationships according to equations 1 to 4. Accordingly, the motor voltage u, as actuating signal, creates a specific rotation speed n. A change in the motor current i leads to a change in the voltage drop across the non-reactive resistor R. Equally, a change in the load moment $M_L$ leads to a change in the rotation speed and therefore to a change in the induced back e.m.f. These two voltage components act on the motor voltage u again, so that a control loop is formed overall.

By taking into account the supplementary spring model, a second mathematical model can be derived, with the aid of which the actual situation can be checked for the presence of a trapping instance. This second model can be represented by a control loop according to FIG. 3. This control loop is extended compared to the control loop according to FIG. 2 by means of the spring model, as is represented by equation 5.

The rotation angle $\phi$ is given by integration of the rotation speed n. The trapping moment $M_E$ is built up on account of the spring constant c. The load moment $M_L$ determined last by means of the first mathematical model according to FIG. 2 is, as a constant variable from the first model, adopted as an input variable $M_L'$ for the second model according to FIG. 3. The input variable $M_L'$ corresponds to a nominal moment $M_G$ which characterizes the total friction of the system. All of the variables incorporated in this second model, specifically the inductor L, the resistor R, the constants $K_1$ to $K_3$ and the moment of inertia J of the motor, are known or can be determined and the rotation speed and therefore the rotation angle can be measured. The single unknown factor is the spring constant c which can thus be determined with the aid of a suitable algorithm on the basis of the second mathematical model.

The variables L, R and $K_1$ and $K_2$ are motor-specific characteristic variables which are known when using a specific type of motor or at least can be determined by experiments. The moment of inertia J and the constant $K_3$ are variables which characterize the adjusting mechanism or the interaction of the motor with the adjusting mechanism, which variables can be and also are likewise determined, in particular, by experiments on reference models. In this case, the constant $K_3$ is determined separately for each type of adjusting device. In this case, the values of the parameter $K_3$ are measured and stored or theoretically determined, particularly with the aid of measurements on an actual model of the adjusting device. It should be noted here that, in particular, the weighting parameter $K_3$ which represents the mechanism of the seat adjusting means is dependent on other variables, for example angle of inclination of the backrest or current longitudinal position of the seat. Therefore, a table of values or a characteristic map for the parameter $K_3$ is created overall and stored in a memory of the control device. The respectively valid parameter values are then taken from this table of values or characteristic map in each case depending on the current position of the seat, and adopted in the calculation for the first or second model. In this case, the values of these parameters can also be processed using fuzzy logic.

Figure 4:
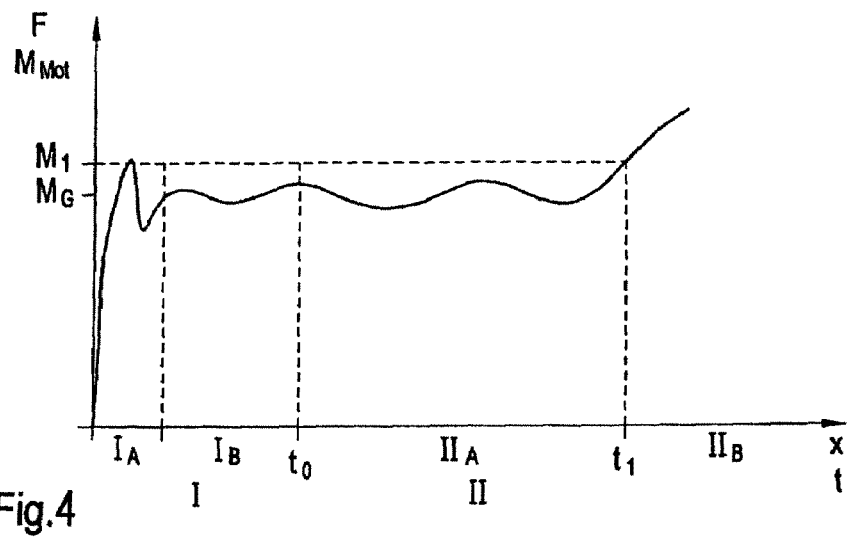
FIG. 4: a schematic and simplified illustration of the profile of the motor torque or the motor force with respect to travel or time.

FIG. 4 illustrates a typical profile of the motor moment $M_{Mot}$ with respect to the adjustment path x or else with respect to time t. The force F exerted by the motor can also be plotted instead of the motor moment $M_{Mot}$. It is not absolutely necessary to determine and to evaluate the motor moment. It is sufficient to determine or additionally use and evaluate a variable which correlates to the exerted force F. The correlated variable is, for example, the detected rotation speed n.

In the method, a distinction is made between a start phase I and a monitoring phase II. The start phase I is divided into two sub-phases $I_A$ and $I_B$, with the sub-phase $I_A$ representing a start-up phase of the motor 2 during which the motor 2 is adjusted to a specific, substantially constant motor moment $M_{Mot}$. The motor moment $M_{Mot}$ remains at this level if there are no frictional changes, running difficulties or trapping situations.

The second sub-phase $I_B$ serves to determine a nominal moment $M_G$. This corresponds to the motor moment $M_{Mot}$ which is output by the motor 2 during this sub-phase $I_B$ and is also called the total moment or total load. The nominal moment $M_G$ is determined, in particular, by calculating the average value of the values for the motor moment $M_{Mot}$ over the second sub-phase. As an alternative to this, the average value is calculated over the entire start phase I and the start-up effects are ignored.

The start phase I becomes the monitoring phase II at a time point $t_0$. In this case, the time point $t_0$ is formed such that the adjusting device has covered a predefined adjustment path up until this time point. The value for the nominal moment $M_G$ determined during the start phase I is first stored as a comparison value for the monitoring phase II. During the monitoring phase II, a significant or characteristic deviation is defined as a difference from the nominal moment $M_G$ and a limit value which is called lower load value $M_1$ is stored. The profile of the motor moment $M_{Mot}$ is now monitored in order to determine whether this lower load limit value $M_L$ is exceeded. In this case, the averaged profile of the rotation speed n is used as a criterion for the profile of the motor moment $M_{Mot}$.

In this case, both the value for the nominal moment $M_G$ and, with it, the lower load value $M_1$ are preferably adapted during the adjustment process. Different frictional values and local running difficulties usually occur, specifically over the adjustment path, so that the motor moment $M_{Mot}$ varies and, for example, also increases continuously over a relatively long adjustment path. If the nominal moment $M_G$ were not adapted, there would be a risk of the load value $M_1$ being exceeded, this being a triggering criterion for checking whether trapping has occurred. In this case, the nominal moment $M_G$ is adapted, for example, by moving average value calculation over a predefined time window or else by means of continued average value calculation, starting from time point $t_0$.

If the load value $M_1$ is exceeded, this is judged to be an indication of a possible trapping instance. At this time point, a changeover is made from the first mathematical model to the second mathematical model and the spring model is now taken into consideration for the calculation. When the changeover is made to the second model, at least one variable which is still determined with the first model is adopted here as an input variable for the second model. This variable is, for example, the value for the last actual nominal moment $M_G$, since this represents the sum of all the moments acting on the drive, excluding the trapping moment $M_E$.

The changeover to the second mathematical model is therefore made at time point $t_A$, at which the load value $M_L$ is exceeded. Therefore, the monitoring phase II is also divided into two sub-phases $II_A$ and $II_B$, with the first mathematical model being used for monitoring purposes during the first sub-phase $II_A$ and the second mathematical model being used during the sub-phase $II_B$.

The second mathematical model is now used to check whether trapping has actually occurred. This is explained in greater detail below with reference to FIGS. 5 to 7. If it is established during this checking operation that trapping has occurred, the motor 2 is automatically stopped and possibly reversed. If it is established that trapping has not occurred, a changeover is then made to the first mathematical model again and the sub-phase $II_A$ of the monitoring phase II is continued.

When checking a seat adjusting means for a trapping instance, the profile of the motor moment $M_{Mot}$ is examined to determine which of the following movement classes are present:

a) running difficulty of the adjusting device,
b) trapping of an object, with a distinction being made here between two trapping situations b1, b2,
c) run-up against an end stop,
d) sudden reaction (panic reaction) and
e) load movement.

Figure 5:
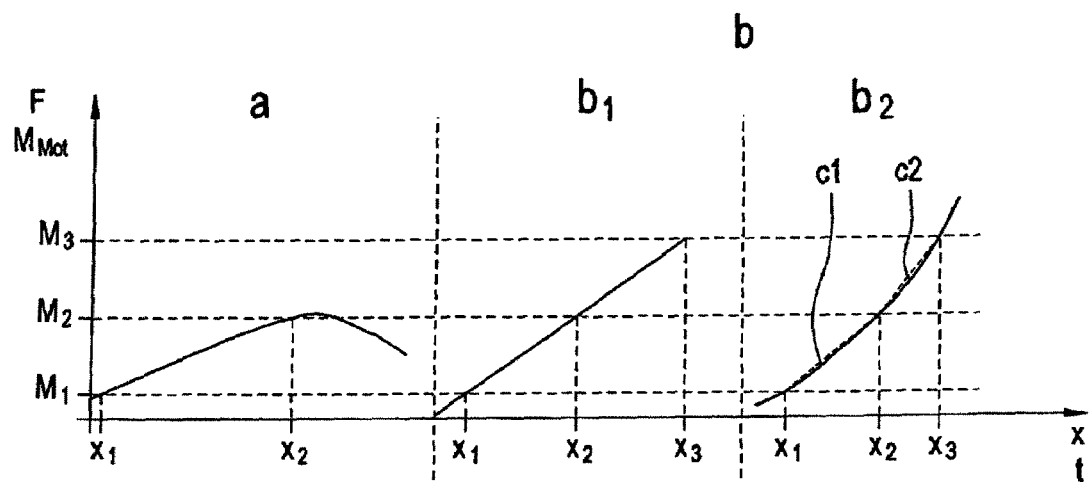
FIGS. 5 and 6: schematic and simplified illustrations of force or torque profiles for different movement classes which occur during the adjustment movement.
Figure 6:
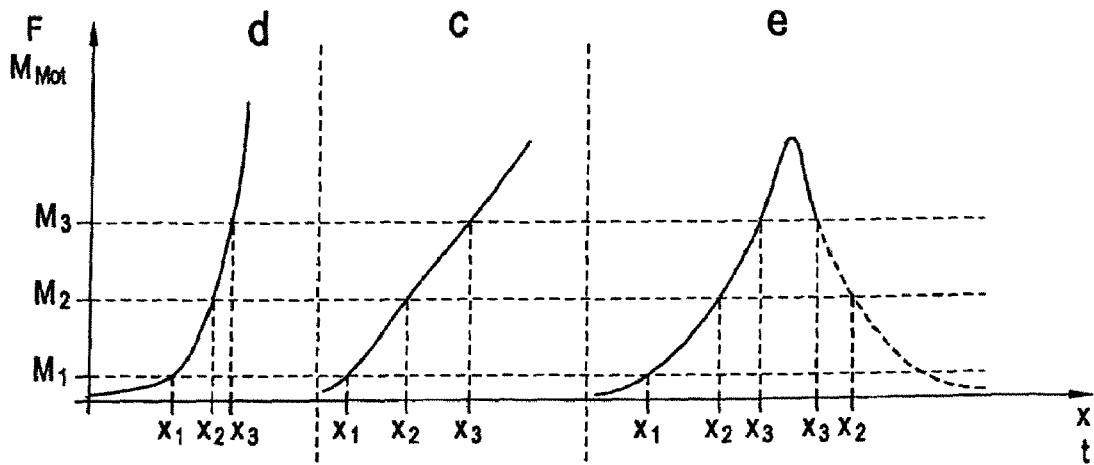

The characteristic profiles for these movement classes of the motor moment $M_{Mot}$ are illustrated in FIGS. 5 and 6. As can be seen from the individual curve sections in FIGS. 5 and 6, the movement class a) for running difficulty is distinguished by a slow increase in moment. High torques are not usually reached in this case. In contrast to this, the curve profile for the movement class for the trapping instance b) is distinguished by a somewhat steeper increase. In this case, the trapping situations can occur, in principle, of a virtually immovable object being trapped. Taking the spring model, which represents the physical reality very well, as a basis, this means a uniform, linear increase in the force exerted by the motor 2 and therefore in its motor moment $M_{Mot}$. This corresponds to the curve section according to $b_1$. However, it is usually expected that the person exerts a certain counterforce. This is illustrated by the curve profile according to $b_2$, according to which the increase in moment is progressive and not linear.

The movement class c) is distinguished by a sharper increase in force compared to movement class b), since here the seat mechanism moves against a mechanical stop. The increase is usually linear in this case since the mechanical stop is characterized by at least a constant spring rate or spring constant c and the force therefore builds up linearly proportionally to the distance covered. In contrast to this, in the case of a load movement (movement class e)), that is to say, for example, movement of the person on the seat during the seat adjustment process, an increase in force which is similar to the amount of movement can be identified, but with the profile of the increase in force no longer being linear like in the event of run-up against the mechanical stop.

Finally, a further movement class d), specifically that of a panic reaction, is defined. It is assumed here that, in certain situations, the person responds to the risk of being trapped with a sudden reaction. This is generally expressed by the person bracing himself against the adjusting movement with all his force. This creates a very steep increase in force. A strictly linear profile is not to be expected here either.

In the spring model which forms the basis, the increase in force or motor moment $M_{Mot}$ corresponds to the gradient or derivative, and therefore to the spring constants c, for evaluation of these different situations. Therefore, the spring constant c, which can be obtained by means of the derivative, is used as the decision criterion as the critical criterion for classifying the currently measured profile of the motor moment $M_{Mot}$. In addition, further decision criteria, which have to be satisfied, are provided for unambiguous association. The term "derivative" is to be understood very broadly here. It is essential for characteristic variables for the profile of the respective motor moment $M_{Mot}$ to be determined, from which characteristic variables conclusions can be drawn as to which movement classes a) to e) are present.

In the exemplary embodiment, an average load value $M_2$ and a maximum load value $M_3$ are defined in addition to the lower load value $M_1$ in order to identify the different movement classes. If the respective load value $M_1$ to $M_3$ is reached, the associated adjustment path $x_1$ to $x_3$ (or else the associated time point t) is stored and value pairs $(M_1, x_1)$, $(M_2, x_2)$ and $(M_3, x_3)$ are respectively formed. As an alternative to this, it is also possible to predefine fixed travel points during the sub-phase $II_B$ and to determine the respectively current motor moment $M_{Mot}$ at these travel points.

A value for the gradient $c_1$, $c_2$ is then determined in each case from the value pairs, in particular by simple linear interpolation or another mathematical interpolation. This is indicated in FIG. 5 in relation to movement class b2. The computational outlay is very low due to the evaluation of only three discrete value pairs. As an alternative to this, it is of course possible to determine the derivative continuously.

Some movement classes a) to e) differ additionally or sometimes only by virtue of the profile of the increase. By determining three value pairs, two intervals are used for evaluation purposes, so that it is possible to identify whether the increase in force is increasing, remaining the same or possibly even decreasing.

In addition to the decision criterion of the derivative (gradient c1, c2), a further decision criterion used is the maximum load value M3 being exceeded. Therefore, a trapping instance is identified only when the derivative moves in a predetermined value range and at the same time the maximum load value $M_3$ is exceeded. With regard to the derivative, the decision value used is not only the absolute value but also the profile of the absolute value.

As can be seen from comparison of FIGS. 5 and 6, it is of critical importance for the movement class for the panic reaction d) to be taken into account as such. The movement classes b1) and b2) represent trapping situations, but the movement classes c) and e), specifically run-up against an end stop and load movement, lie between these two trapping situations. However, it is undesirable to switch off or reverse the motor, particularly in the case of load movement. Therefore, high decision reliability for identifying a trapping instance, without having to accept losses in comfort, is possible only by checking the curve profile for such a panic reaction.

The derivative is of particular importance for associating the currently measured profile with the individual movement classes a) to e). For association in terms of which value of the derivative or which profile of the derivative is to be associated with which of the movement classes a) to e), it is expedient—similarly to in the case of the weighting factor $K_3$—to store the individual values or profiles of the derivative in a table or in a characteristic map from which association with the individual movement classes can be performed directly or with the aid of a fuzzy logic, taking into account further boundary parameters. In this case, the table or the characteristic map is preferably likewise determined in the manner of a calibration process on the basis of a specific physical model, or empirical values are employed.

Figure 7:
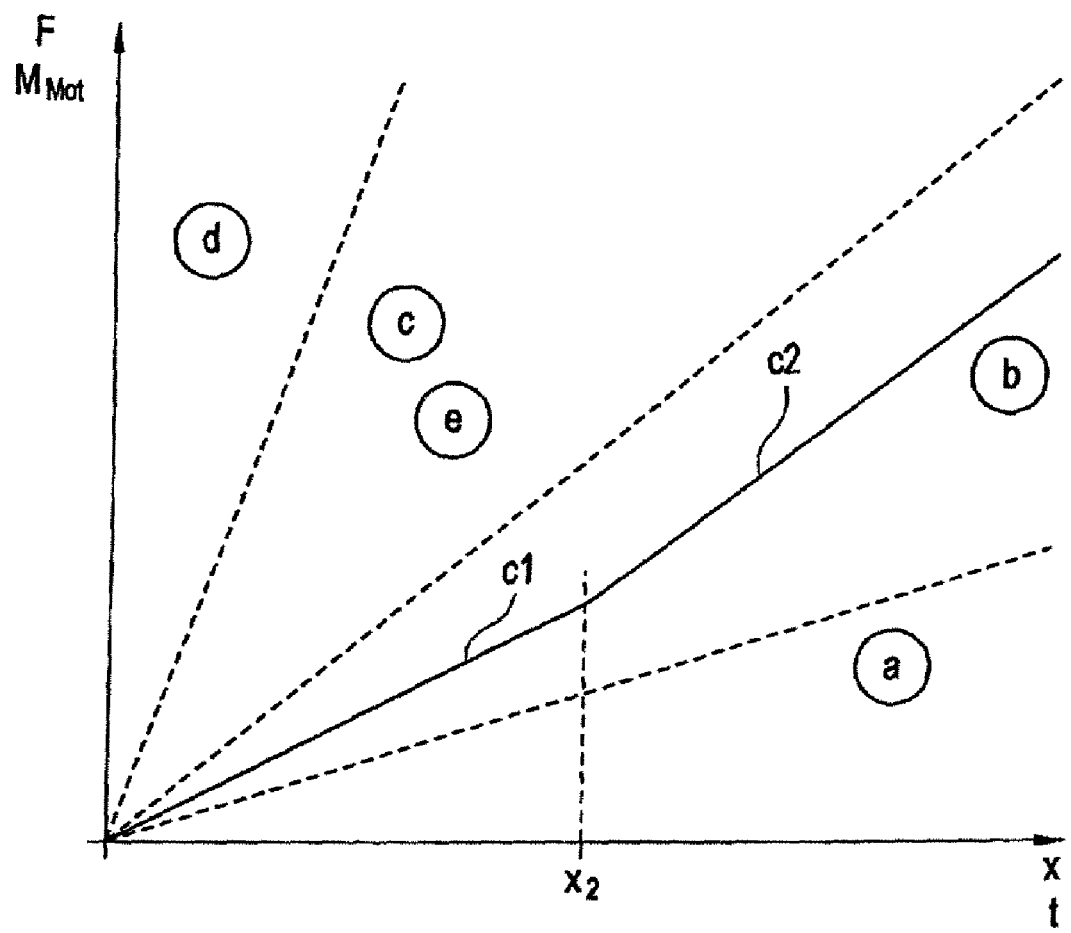
FIG. 7: a schematic and simplified illustration of a force/travel graph in which the individual movement classes are associated with different regions.

FIG. 7 illustrates a force/travel graph which is derived from such a characteristic map and in which the individual regions which are to be associated with the movement classes a)-e) are separated from one another by dashed lines. Furthermore, a force profile with a progressive increase in force in the event of trapping is plotted, by way of example, with the determined gradient values c1, c2.

Figure 8:
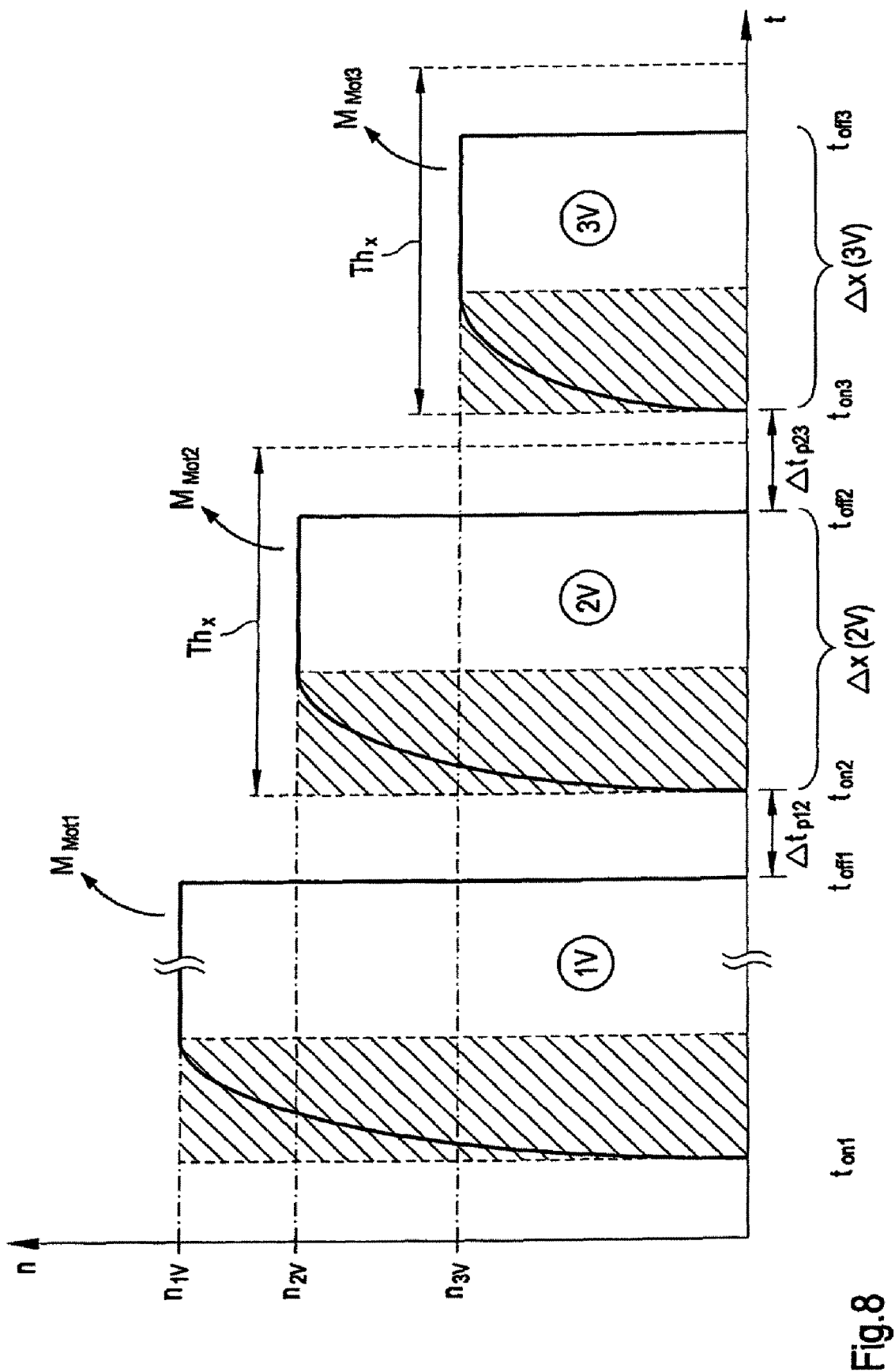
FIG. 8: a schematic and simplified illustration of a rotation speed/time graph in which brief actuation operations of the adjustment means take place one after the other.

FIG. 8 shows a graph in which a rotation speed n of the motor 2 is plotted against time t, by way of example. Three adjustment operations 1V, 2V and 3V, which are separated from one another by two adjustment breaks $\Delta t_{p12}$ and $\Delta t_{p23}$, are illustrated. During the first adjustment operation 1V, the rotation speed n reaches the first value $n_{1V}$. A first motor moment $M_{Mot1}$ is determined as the first total load from the rotation speed n during this first adjustment operation 1V. During the second adjustment operation 2V, the rotation speed n reaches the second value $n_{2V}$ which is lower than the first value $n_{1V}$. A second motor moment $M_{Mot2}$ is determined as the second total load from the rotation speed n during this second adjustment operation 2V. During the third adjustment operation 3V, the rotation speed n reaches the value $n_{3V}$ which is in turn lower than the second value $n_{2V}$. A third motor moment $M_{Mot3}$ is determined as the third total load from the rotation speed n during this third adjustment operation 3V. This reduction in rotation speed n over the three adjustment operations 1V, 2V and 3V is intended to schematically illustrate a trapping instance which can occur in the event of a plurality of brief actuation operations of an adjusting device in the same adjustment direction and can be determined by a seat controller, as explained below.

The adjustment operation 1V is started at time point $t_{on1}$. In this case, the region bounded by dashed lines corresponds to the sub-phase $I_A$ which represents the start-up phase of the motor 2. In this start-up phase of the motor 2, the motor 2 is accelerated to the rotation speed $n_{V1}$. The rotation speed n can be varied during the first adjustment operation 1V, this not being illustrated in FIG. 8 in order to simplify the illustration. The motor moment $M_{Mot1}$ and the nominal moment $M_G$ are determined from the rotation speed n during the first adjustment operation 1V. The first adjustment operation 1V is terminated at time point $T_{off1}$, and the value for the nominal moment $M_G$ is kept stored.

The second adjustment operation 2V is started at time point $t_{on2}$. The rotation speed n reaches the value $n_{2V}$ after the start-up phase of the motor 2. The current second motor moment $M_{Mot2}$ is determined from this value. Since a shorter adjustment path $\Delta x(2V)$ than a threshold ($Th_x$, see FIG. 9) is covered during the second adjustment operation 2V, the value for the nominal moment $M_G$ stored up until this point continues to be stored and is used as an input variable for the trapping prevention algorithm. In order to detect a trapping instance, the motor moment $M_{Mot2}$ during the second adjustment operation 2V is evaluated together with the nominal moment $M_G$ for determining a trapping instance. The second, brief adjustment operation 2V is terminated at time point $t_{off2}$.

The third adjustment operation V3 is started at time point $t_{on3}$. This third adjustment operation likewise lasts only briefly, so that a shorter adjustment path $\Delta x(3V)$ than a threshold ($Th_x$, see FIG. 9) which correlates with an adjustment distance is covered during the third adjustment operation 3V. The nominal moment $M_G$ determined during the first adjustment operation 1V continues to be stored and is used as an input variable to determine a trapping instance. The current third motor moment $M_{Mot3}$ which is determined from the speed $n_{3V}$ is evaluated together with the stored nominal moment $M_G$ during the third adjustment operation 3V.

Figure 9:
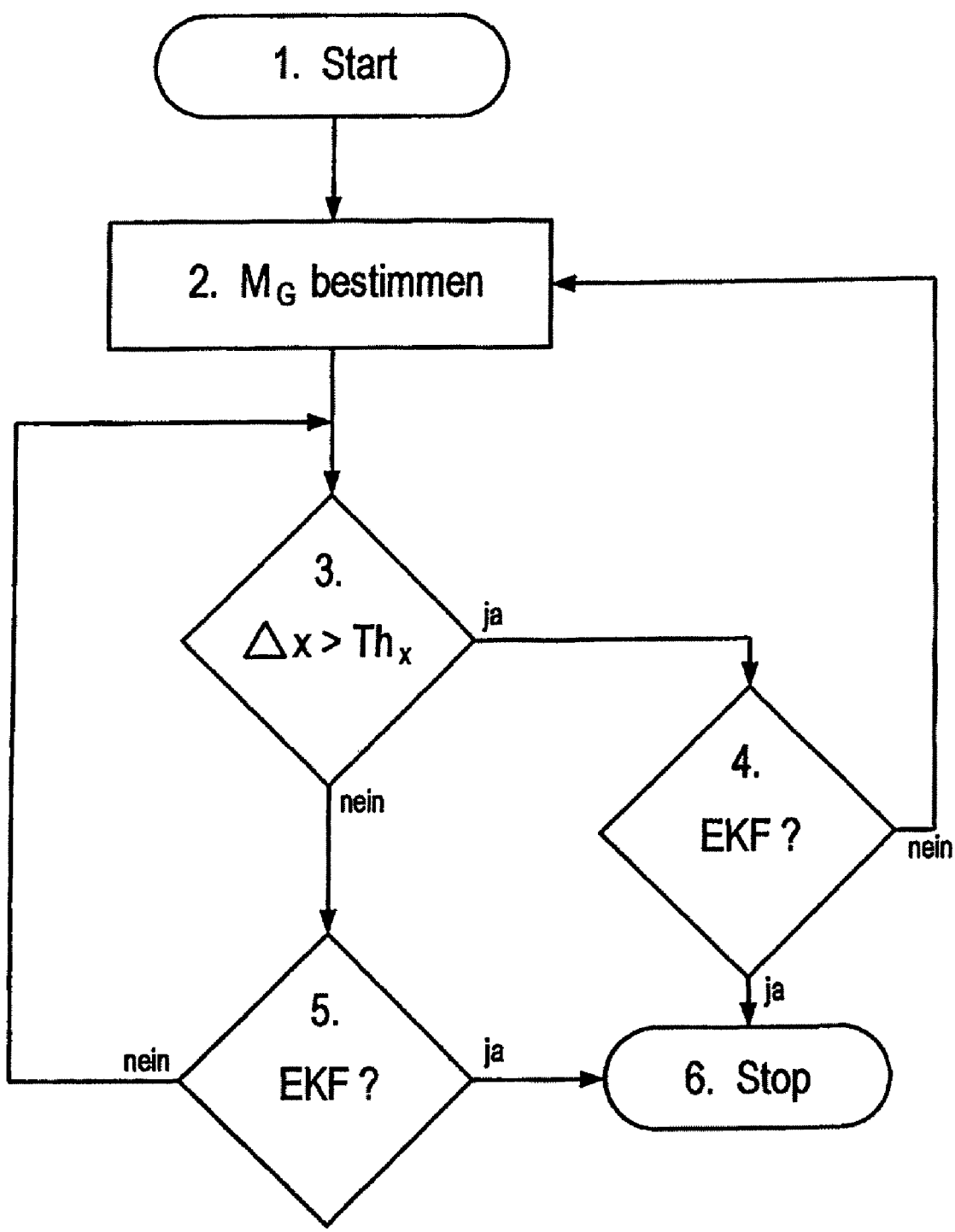
FIG. 9: a schematic and simplified illustration of a flowchart for a trapping prevention guard which distinguishes between continuous and brief actuation.

A portion of the algorithm is schematically illustrated as a flowchart in FIG. 9. The algorithm is started in step 1. The start can be initiated in an adjustment direction, for example, by a first actuation operation. A nominal moment $M_G$ is then continuously determined during the adjustment operation in step 2. If the adjustment path $\Delta x$ covered reaches a threshold $Th_x$ in step 3, a trapping instance is determined with the determined nominal moment $M_G$ in step 4. If a trapping instance can be determined, the adjustment operation is stopped or reversed in step 6. Otherwise, the nominal moment continues to be continuously determined in step 2.

If the adjustment path $\Delta x$ covered in step 3 is smaller than the threshold $Th_x$, a trapping instance is determined in step 5. In this case, the input variable used for this determination is the nominal moment $M_G$ which was determined in a preceding adjustment operation and is still stored. If a trapping instance cannot be determined in step 5, the threshold value comparison is then performed again in step 3. If the adjustment path $\Delta x$ covered is greater than the threshold $Th_x$ in step 3, the nominal moment $M_G$ is determined again in step 2, possibly following step 4. Otherwise, the adjustment operation is stopped in step 6, following identification of a trapping instance in step 5.

What it claimed is:

1. A seat control electronic system having a trapping prevention function for a motor driven seat adjusting device, with the seat control electronic system being configured
   to determine an adjusting movement of a drive from at least one detected characteristic variable of the drive, and
   to determine a trapping instance from measured values of the characteristic variable of a first adjustment operation and from measured values of the characteristic variable of a second and/or further brief adjustment operations during a plurality of brief adjustment operations of the drive in the same adjustment direction,
   to determine a first total load exerted by the drive during the first adjustment operation,
   to determine a second total load exerted by the drive after an adjustment break for the second adjustment operation in the same adjustment direction,
   to not reject an evaluation of the determined first total load if an adjustment path or adjustment time of the second adjustment operation falls below a threshold,
   to stop the drive or to reverse the adjustment direction of the drive if a trapping instance is detected as a function of an evaluation of the first total load and the second total load,
   to determine and store a second nominal load first during a start phase of the second adjustment operation from the second nominal load if the adjustment path of the second adjustment operation exceeds the threshold, and
   to determine whether trapping has occurred during a monitoring phase from a comparison between the second nominal load and the second total load which varies during the second adjustment operation,
   wherein, in order to delete the evaluation after the threshold is exceeded, the seat control electronic system is configured to replace the determined first nominal load with the second nominal load for the further determination of a trapping instance.

2. The seat control electronic system according to claim 1, wherein said seat control electronic system is configured to determine and to store a first nominal load during the first adjustment operation from the first total load, and which is configured to determine whether trapping has occurred during the second adjustment operation from a comparison between the first nominal load and the second total load which varies during the second adjustment operation.

3. The seat control electronic system according to claim 1, in which the start phase corresponds to a translatory adjustment path of up to 50 mm or an inclination adjustment of approximately 10 of the adjusting device.

4. The seat control electronic system according to claim 1, which is designed to determine a third total load after a further adjustment break in the event of a third adjustment operation in the same adjustment direction, to not delete an evaluation of the determined first total load if an adjustment path of the third adjustment operation falls below the threshold, and to stop the drive or to reverse the adjustment direction of the drive if a trapping instance is detected as a function of an evaluation of the first total load and the third total load.

5. The seat control electronic system according to claim 1, wherein the seat control electronic system is configured to employ a first mathematical model in order to determine a total load, and to change over to a second mathematical model which takes into account the trapping instance only if there is a deviation between the total load and a nominal load or if there is a deviation between the detected characteristic variable for assessing whether trapping has occurred.

6. A motor vehicle comprising the seat control electronic system according to claim 1.

7. A seat control electronic system for controlling a drive of a motor vehicle seat, which is configured to detect a characteristic variable of the drive during a plurality of brief actuation operations of the drive, to evaluate the characteristic variable which is in each case associated with the plurality of brief actuation operations, and to determine a trapping instance as a function of these evaluations of a plurality of actuation operations.

8. A method for controlling a motor-driven motor vehicle adjusting device, wherein a total load that is exerted by the drive is derived from at least one detected characteristic variable of a drive in order to monitor for a trapping instance, the method comprising determining a first total load during a first adjustment operation, determining a second total load after an adjustment break in the event of a second adjustment operation in the same adjustment direction, not rejecting an evaluation of the determined first total load if an adjustment path or adjustment time of the second adjustment operation falls below a threshold, stopping the drive or reversing the adjustment direction of the drive if a trapping instance is detected as a function of an evaluation of the first total load and the second total load, determining and storing a second nominal load first during a start phase of the second adjustment operation from the second nominal load if the adjustment path of the second adjustment operation exceeds the threshold, and determining whether trapping has occurred during a monitoring phase from a comparison between the second nominal load and the second total load which varies during the second adjustment operation, wherein, in order to delete the evaluation after the threshold is exceeded, the seat control electronic system is configured to replace the determined first nominal load with the second nominal load for the further determination of a trapping instance.

9. The method according to claim 8, the method further comprising determining and storing a first nominal load during the first adjustment operation from the first total load, and determining whether trapping has occurred during the second adjustment operation from a comparison between the first nominal load and the second total load which varies during the second adjustment operation.

10. The method according to claim 9, wherein, in order to delete the evaluation after the threshold is exceeded, the determined first nominal position is replaced with the second nominal load for the further determination of a trapping instance.

11. The method according to claim 8, the method comprising determining a third total load after a further adjustment break in the event of a third adjustment operation in the same adjustment direction, not deleting an evaluation of the determined first total load and/or an evaluation of the determined second total load if an adjustment path of the third adjustment operation falls below the threshold, and the drive is stopped or the adjustment direction of the drive is reversed if a trapping instance is detected as a function of an evaluation of the first total load and the third total load.

* * * * *